(12) United States Patent
Nelson et al.

(10) Patent No.: US 7,084,884 B1
(45) Date of Patent: Aug. 1, 2006

(54) GRAPHICAL OBJECT INTERACTIONS

(75) Inventors: Donald Nelson, Mountain View, CA (US); Christopher J. Ulrich, San Francisco, CA (US)

(73) Assignee: Immersion Corporation, San Jose, CA (US)

(*) Notice: Subject to any disclaimer, the term of this patent is extended or adjusted under 35 U.S.C. 154(b) by 79 days.

(21) Appl. No.: 09/912,434

(22) Filed: Jul. 24, 2001

Related U.S. Application Data

(63) Continuation-in-part of application No. 09/432,362, filed on Nov. 3, 1999, now abandoned.

(60) Provisional application No. 60/273,311, filed on Mar. 1, 2001, provisional application No. 60/220,302, filed on Jul. 24, 2000, provisional application No. 60/106,904, filed on Nov. 3, 1998.

(51) Int. Cl.
*G09G 5/00* (2006.01)
*G06F 3/00* (2006.01)

(52) U.S. Cl. ............... 345/619; 345/156; 715/701; 715/702

(58) Field of Classification Search ........ 345/473, 345/619, 701, 702, 156, 419, 647, 648, 672, 345/676–681; 715/701, 702
See application file for complete search history.

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |
| 3,911,416 A | 10/1975 | Feder |
| 4,127,752 A | 11/1978 | Lowthorp |
| 4,160,508 A | 7/1979 | Salisbury, Jr. |
| 4,236,325 A | 12/1980 | Hall et al. |
| 4,262,549 A | 4/1981 | Schwellenbach |
| 4,333,070 A | 6/1982 | Barnes |
| 4,464,117 A | 8/1984 | Foerst |
| 4,484,191 A | 11/1984 | Vavra |
| 4,513,235 A | 4/1985 | Acklam et al. |
| 4,542,291 A | 9/1985 | Zimmerman |
| 4,581,491 A | 4/1986 | Boothroyd |
| 4,599,070 A | 7/1986 | Hladky et al. |
| 4,708,656 A | 11/1987 | de Vries et al. |
| 4,713,007 A | 12/1987 | Alban |

(Continued)

OTHER PUBLICATIONS

Baigrie, "Electric Control Loading—A Low Cost, High Performance Alternative," *Proceedings of Interservice/Industry Training Systems Conference*, pp. 247-254, Nov. 6-8, 1990.

(Continued)

*Primary Examiner*—Richard Hjerpe
*Assistant Examiner*—Chante Harrison
(74) *Attorney, Agent, or Firm*—Thelen Reid & Priest LLP; David B. Ritchie

(57) ABSTRACT

A method of controlling the display of an articulated graphical image in a graphical environment comprises sensing manipulation of a user object, controlling the displayed position or shape of the articulated graphical image in relation to the sensed manipulation, and when the articulated graphical image interacts with a graphical object, changing the relationship between the displayed position or shape of the articulated graphical image and the sensed manipulation. In one version, the display of the graphical image is calculated by an algorithm utilizing numerical methods.

13 Claims, 6 Drawing Sheets

U.S. PATENT DOCUMENTS

| | | |
|---|---|---|
| 4,794,392 A | 12/1988 | Selinko |
| 4,885,565 A | 12/1989 | Embach |
| 4,891,764 A | 1/1990 | McIntosh |
| 4,930,770 A | 6/1990 | Baker |
| 4,934,694 A | 6/1990 | McIntosh |
| 4,988,981 A | 1/1991 | Zimmerman et al. |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,078,152 A | 1/1992 | Bond et al. |
| 5,165,897 A | 11/1992 | Johnson |
| 5,175,459 A | 12/1992 | Danial et al. |
| 5,184,009 A | 2/1993 | Wright et al. |
| 5,184,319 A | 2/1993 | Kramer |
| 5,186,695 A | 2/1993 | Mangseth et al. |
| 5,212,473 A | 5/1993 | Louis |
| 5,240,417 A | 8/1993 | Smithson et al. |
| 5,271,290 A | 12/1993 | Fischer |
| 5,275,174 A | 1/1994 | Cook |
| 5,283,970 A | 2/1994 | Aigner |
| 5,298,890 A | 3/1994 | Kanamaru et al. |
| 5,299,810 A | 4/1994 | Pierce et al. |
| 5,309,140 A | 5/1994 | Everett, Jr. et al. |
| 5,334,027 A | 8/1994 | Wherlock |
| 5,354,162 A | 10/1994 | Burdea et al. |
| 5,436,622 A | 7/1995 | Gutman et al. |
| 5,437,607 A | 8/1995 | Taylor |
| 5,466,213 A | 11/1995 | Hogan et al. |
| 5,547,382 A | 8/1996 | Yamasaki et al. |
| 5,563,632 A | 10/1996 | Roberts |
| 5,575,761 A | 11/1996 | Hajianpour |
| 5,625,576 A | 4/1997 | Massie et al. |
| 5,631,861 A | 5/1997 | Kramer |
| 5,690,582 A | 11/1997 | Ulrich et al. |
| 5,694,013 A | 12/1997 | Stewart et al. |
| 5,766,016 A | 6/1998 | Sinclair et al. |
| 5,785,630 A | 7/1998 | Bobick et al. |
| 5,790,108 A | 8/1998 | Salcudean et al. |
| 5,802,353 A | 9/1998 | Avila et al. |
| 5,825,308 A | 10/1998 | Rosenberg |
| 5,835,693 A * | 11/1998 | Lynch et al. ............... 345/473 |
| 5,844,392 A | 12/1998 | Peurach et al. |
| 5,877,748 A | 3/1999 | Redlich |
| 5,889,528 A * | 3/1999 | Zhao ........................ 345/648 |
| 5,912,658 A | 6/1999 | Bergamasco et al. |
| 5,973,678 A | 10/1999 | Stewart et al. |
| 5,986,643 A | 11/1999 | Harvill et al. |
| 6,028,593 A | 2/2000 | Rosenberg et al. |
| 6,042,555 A | 3/2000 | Kramer et al. |
| 6,059,506 A | 5/2000 | Kramer |
| 6,061,004 A * | 5/2000 | Rosenberg ................. 345/701 |
| 6,084,587 A * | 7/2000 | Tarr et al. .................. 345/419 |
| 6,104,379 A | 8/2000 | Petrich et al. |
| 6,111,577 A | 8/2000 | Zilles et al. |
| 6,131,097 A | 10/2000 | Peurach et al. |
| 6,160,489 A | 12/2000 | Perry et al. |
| 6,232,891 B1 * | 5/2001 | Rosenberg ................. 345/701 |
| 6,413,229 B1 | 7/2002 | Kramer et al. |
| 6,422,941 B1 | 7/2002 | Thorner et al. |
| 6,697,044 B1 * | 2/2004 | Shahoian et al. ........... 345/156 |

OTHER PUBLICATIONS

Iwata, "Pen-based Haptic Virtual Environment," 0-7803-1363-1/93 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication 85-11*, NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., Model-X Force-Reflecting-Hand-Controller, NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflecting Manipulandum for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al, Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation," *Science*, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee et al., "Teleoperator Subsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Scannell, "Taking a Joystick Ride," Computer Currents, Boston Edition, vol. 9, No. 11, Nov. 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

P. Coiffet et al., "The LRP Dextrous Hand Master," *VR Systems Fall 1993 Conference*, Sig Advanced Applications, New York City, Oct. 1993.

D. H. Gomez et al., "Integration of the Rutgers Master II in a Virtual Reality Simulation" *1995 IEEE Virtual Reality Annual International Symposium*, pp. 198-202, San Francisco, CA, 1995.

G R. Luecke et al., "An Exoskeleton Manipulator for Application of Electro-Magnetic Virtual Forces," *Proceedings of the 1996 ASME Dynamics Systems and Control Division*, pp. 489-494, Atlanta, GA, Nov. 17-22, 1996.

L. Rosenberg, A Force Feedback Programming Primer—For PC Gaming Peripherals Supporting I-Force 2.0 and Direct X 5.0, San Jose, CA, 1997.

SensAble Technologies, "GHOST Software Developer's Toolkit—Programmer's Guide Version 1.1," Cambridge, MA 1996.

T. V. Thompson II et al., "Maneuverable Nurbs Models within a Haptic Virtual Environment," *Proceedings of the 1997 ASME Dynamics Systems and Control Division*, pp. 37-44, Dallas, TX, Nov. 16-21, 1997.

H. Noma et al., "Cooperative Object Manipulation in Virtual Space Using Virtual Physics," *Proceedings of the 1997 ASME Dynamic Systems and Control Division*, pp. 101-106, Dallas, TX, Nov. 16-21, 1997.

Gardner, Dana L., "The Power Glove," *Design News*, Dec. 4, 1989, pp. 63-68.

Eddy, Andy, "Power Glove: Get a Grip On Your Games," *Video Games and Computer Entertainment*, Sep. 1989, pp. 18-20.

Brooks F., et al., "Project GROPE—Haptic Displays for Scientific Visualization," *Computer Graphics*, vol. 24, No. 4, 1990, pp. 177-185.

Hirota, Koichi et al., "Development of Surface Display," *IEEE* 0-7803-1363-1, 1993, pp. 256-262.

Rosenberg, Louis B., "Perceptual Design of a Virtual Rigid Surface Contact," Center for Design Research Stanford University, Air Force Material Command, Apr. 1993, pp. 1-41.

Colgate, J. et al., "Implementation of Stiff Virtual Walls in Force-Reflecting Interfaces," Sep. 22, 1993.

Kelley, A.J. et al., "MagicMouse: Tactile and Kinesthetic Feedback in the Human-Computer Interface using an Electromagnetically Actuated Input/Output Device," Dept. of Elec. Engineering, Univ. of British Columbia, 1993, pp. 1-27.

Rosenberg L. et al., "Perceptual Decomposition of Virtual Haptic Surfaces," *Proceedings IEE Symposium on Research Frontiers in Virtual Reality*, Oct. 1993.

* cited by examiner

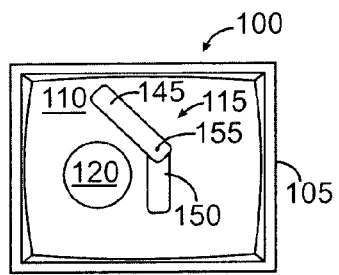
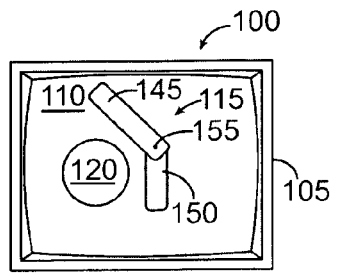
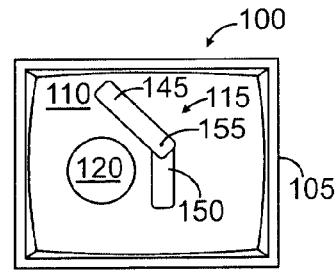
FIG. 6a      FIG. 7a      FIG. 8a
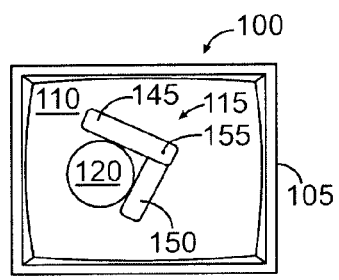
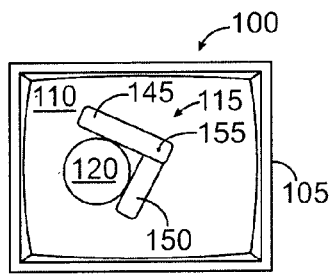
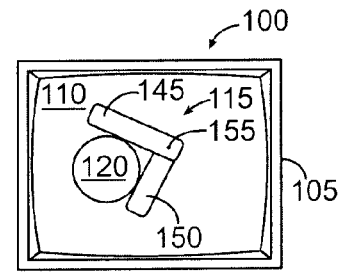
FIG. 6b      FIG. 7b      FIG. 8b
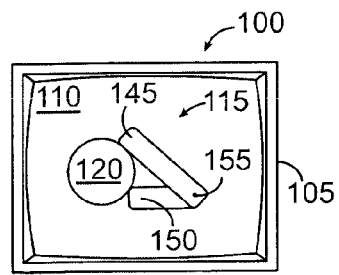
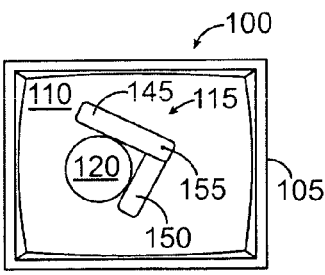
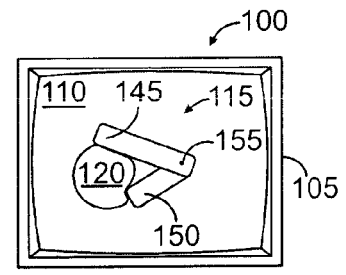
FIG. 6c      FIG. 7c      FIG. 8c

GRAPHICAL OBJECT INTERACTIONS

CROSS REFERENCE TO RELATED APPLICATIONS

This application is a continuation-in-part of U.S. patent application Ser. No. 09/432,362 filed on Nov. 3, 1999 now abandoned which claims priority from U.S. Provisional Patent Application 60/106,904 filed on Nov. 3, 1998. This application also claims priority from co-pending U.S. Provisional Patent Application 60/220,302 filed on Jul. 24, 2000 and U.S. Provisional Patent Application 60/273,311 filed on Mar. 1, 2001. All of the above-listed applications are incorporated herein by reference in their entireties.

BACKGROUND

The present invention relates to the interaction of graphical objects in a graphical environment.

A user may interface with electronic and mechanical devices in a variety of applications, and the need for a natural and informative interaction is a constant concern. For example, in one application, a user may interface with computer devices to interact with computer-generated environments, such as virtual reality environments, including games, surgical simulations, and application programs. Computer input devices such as mice and trackballs are often used to control a graphical image, such as a cursor, within a graphical environment and provide input in these applications.

The graphical image may be a graphical representation of a portion of the user or of an instrument being engaged by the user. This representation may be an abstraction, such as a pointer cursor that interacts with a graphical user interface, or more realistic representation, such as a graphical surgical instrument being used in a simulated surgical procedure. With either representation, the user may control the positioning of the graphical image and may cause the graphical image to interact with graphical objects within the graphical environment. When this interaction is not realistic, the simulation may be disconcerting to the user. For example, a user may cause a graphical instrument to abut a barrier. However, the user may view the graphical instrument penetrating the graphical barrier, thereby reducing the realism of the simulation.

In some interface devices, force feedback and/or tactile feedback is also provided to the user, collectively known herein as "haptic feedback." For example, haptic versions of joysticks, mice, gamepads, steering wheels, or other types of devices can output forces to the user based on events or interactions occurring within the graphical environment, such as in a game or other application program. In a virtual reality simulation, it is often desirable to graphically represent a user or a portion of the user in the graphical environment and to allow the user to realistically interact with the graphical environment. However, even with these haptic devices, the forces may be insufficient to prevent the interface device from allowing, for example, the graphical instrument from penetrating the graphical barrier.

SUMMARY

To overcome the deficiencies of the prior art, it is desirable to provide an interface device that improves the interaction of a user with a graphical environment. It is further desirable to provide an interface device that displays a realistic interaction between a graphical image and a graphical object.

The present invention satisfies these needs. In one aspect of the invention, a method of controlling the display of an articulated graphical image in a graphical environment comprises sensing manipulation of a user object, controlling the displayed position or shape of the articulated graphical image in relation to the sensed manipulation, and when the articulated graphical image interacts with a graphical object, changing the relationship between the displayed position or shape of the articulated graphical image and the sensed manipulation.

In another aspect of the invention, a method of controlling the display of a graphical image in a graphical environment comprises sensing manipulation of a user object, controlling the displayed position or shape of the graphical image in relation to the sensed manipulation, and when the articulated graphical image interacts with a graphical object, changing the relationship between the displayed position or shape of the graphical image and the sensed manipulation by calculating a position or shape of the graphical image using an algorithm using numerical methods.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

FIGS. 6a through 6c are schematics of an interaction between a graphical image and a graphical object having fifth constraints;

FIGS. 7a through 7c are schematics of an interaction between a graphical image and a graphical object having sixth constraints;

FIGS. 8a through 8c are schematics of an interaction between a graphical image and a graphical object having seventh constraints;

DESCRIPTION

The present invention relates to interactions with graphical objects such as graphical objects generated during computer simulations. More particularly the invention relates to computer simulations involving the control of a graphical image, such as a graphical image that is an articulated graphical representation of a portion of a user or an object under the control of a user. Although the process is illustrated at least partly in the context of controlling a graphical hand, the present invention can be used in other simulation and computer interactive processes and/or to control other graphical images and should not be limited to the examples provided herein.

Figure 1:
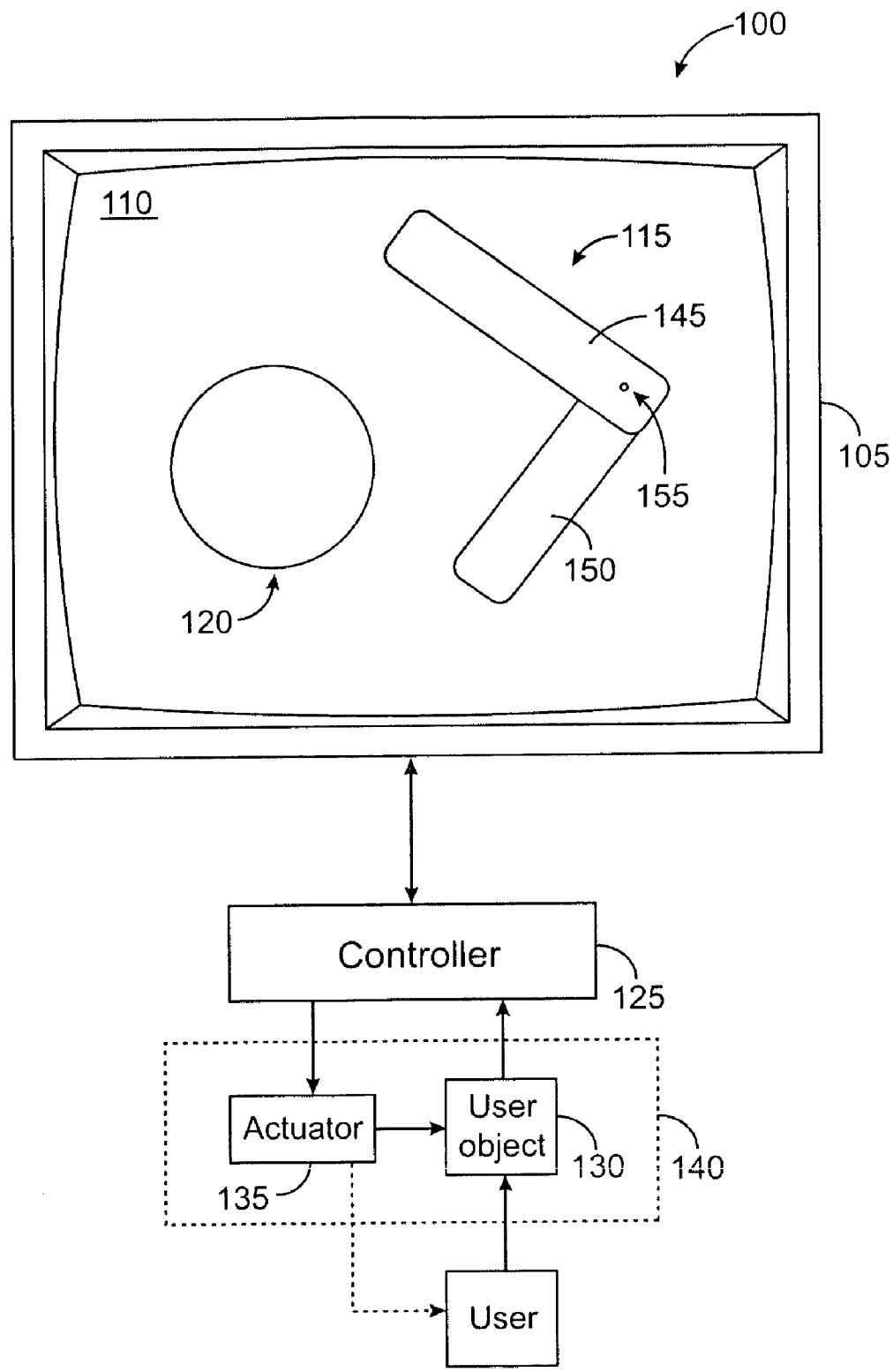
FIG. 1 is a schematic diagram of a simulation system according to the present invention.

FIG. 1 is a schematic illustration of a simulation system 100 according to the invention. The simulation system 100 is capable of generating, for example, a simulated graphical environment. A display 105 provides the graphical environment 110 to a user. Within the graphical environment 110 is a graphical image 115. The graphical image 115 may be, for example, a cursor or other graphical object, the position, movement, and/or shape of which is controllable. For example, the graphical image 115 may be a pointer cursor, a character in a game, a surgical instrument, a view from the end of a surgical instrument, a representative portion of the user, or the like. Also within the graphical environment is a graphical object 120 such as a ball, as shown, or any other graphical representation including another graphical image that may be controlled by the user or by another user. A controller 125 in communication with the display 105 is capable of generating and/or controlling the graphical environment 110, for example by executing program code including an application program related to the simulation. A user object 130 is manipulatable by a user, and the manipulation of the user object 130 controls the position, orientation, shape and/or other characteristic of the graphical image 115 within the graphical environment 110, for example by directly correlating a position of the user object 130 with a displayed position of the graphical image 115 or by correlating a position of the user object 130 with a rate of movement of the graphical image 115. Either the entire user object 130 may be manipulatable by the user or a portion of the user object 130 may be manipulatable relative to another portion of the user object 130. For example, the user object may be a surface that is engaged by one or more hands of a user, such as a joystick, a mouse, a mouse housing, a stylus, a knob, an elongated rigid or flexible member, an instrumented glove, or the like and may be moveable in from one to six degrees of freedom.

Optionally, haptic feedback may be provided to the user to increase the realism of the virtual reality environment. For example, when a predetermined event occurs within the graphical environment 110, such as an interaction of the graphical image 115 with the graphical object 120, the controller 125 may cause an actuator 135 to output a haptic sensation to the user. In the version shown, the actuator 135 outputs the haptic sensation to the user object 130 through which the sensation is provided to the user. The actuator 135 and the user object 130 may be part of a haptic interface device 140. The actuator 135 may be positioned in the haptic interface device 140 to apply a force to the user object 130 or to a portion of the user object. For example, the haptic interface device 140 may comprise a user object 130, such as a mouse housing, having an actuator 135 within the user object 130, such as a vibrating motor within the mouse housing, or the haptic interface device may comprise a user object 130, such as a mouse, that is mechanically linked to an actuator 135. Alternatively, the actuator 135 and the user object 130 may be separate structures, and the actuator 135 may provide a haptic sensation directly to the user, as shown by the phantom arrow in FIG. 1.

The actuator 135 may provide the haptic sensation actively or passively. For example, the actuator 135 may comprise one or more motors coupled to the user object 130 to apply a force to the user or to the user object 130 in one or more degrees of freedom. Alternatively or additionally, the actuator 135 may comprise one or more braking mechanisms coupled to the user object to inhibit movement of the user or the user object 130 in one or more degrees of freedom. By haptic sensation it is meant any sensation provided to the user that is related to the user's sense of touch. For example, the haptic sensation may comprise kinesthetic force feedback and/or tactile feedback. By kinesthetic force feedback it is meant any active or passive force applied to the user to simulate a force that would be experienced in the graphical environment 110, such as a grounded force applied to the user or the user object 130 to simulate a force experienced by at least a portion of the graphical image 115. For example, if the graphical image 115 is positioned against a surface, a barrier or an obstruction, the actuator 135 may output a force against the user object 130 preventing or retarding movement of the user or the user object 130 in the direction of the barrier or obstruction. By tactile feedback it is meant any active or passive force applied to the user to provide the user with a tactile indication of a predetermined occurrence within the graphical environment 110. For example, a vibration, click, pop, or the like may be output to the user when the graphical image 115 interacts with a graphical object 120. Additionally, tactile feedback may comprise a tactile sensation applied to approximate or give the illusion of a kinesthetic force. For example, by varying the frequency and/or the amplitude of an applied vibration, variations in surface textures of different graphical objects can be simulated or by providing a series of clicks when a graphical image penetrates an object, resistance to the penetration can be simulated. For example, in one version a kinesthetic force sensation, such as a spring force, may be applied to the user whenever the graphical image 115 engages the graphical object 120 to simulate a selectively deformable surface. Alternatively or additionally, a tactile sensation, such as a pop, may be applied to the user when the graphical image 115 is moved across a surface of the graphical object 120 to simulate a texture of the graphical object 120.

With either a haptic or a non-haptic interface 140, the display of the graphical image 115 within the simulated graphical environment 110 may be controlled to closely simulate realism. For example, in one type of a graphical environment, such as a Windows™ operating system, the position of a graphical image, such as a pointer cursor, may be directly related to the position of a user object 130 as the graphical image moves throughout the graphical environment. In this type of graphical environment, the graphical image may be displayed as overlaying graphical objects in the graphical environment. In another type of graphical environment, such as the one shown in FIG. 1, the graphical image 115 may be representative of a physical object, such as a portion of a user or an instrument, and the graphical object 120 may be representative of another physical object. Thus, it may be desirable to allow the graphical image 115 and the graphical object 120 to interact in a more realistic manner than an overlay. For example, as the graphical image 115 contacts the boundary of the graphical object 120, the graphical image 115 may be displayed as contacting the outer surface of the graphical object 120 rather than penetrating it, even as the user object 130 is manipulated to otherwise cause the graphical image 115 to further penetrate the graphical object 120. Therefore, the relationship between the manipulation of the user object 130 and the displayed position of the graphical image 115 changes as the graphical image 115 interacts with the graphical object 120. An example of breaking the mapping of a graphical image is disclosed in U.S. Pat. No. 6,028,593, which is incorporated herein by reference in its entirety.

In one version of the invention, constraints may be assigned to the graphical image 115 and/or the graphical object 120 to control the interactions within the graphical environment 110. For example, the objects may be selected to be hard and impenetrable. With this setting, when the graphical image 115 intersects the graphical object 120, the display of the graphical image 115 is held at the point of intersection. Additionally, the display of the entire graphical image 115 may be altered based on the interaction with the graphical object 120. For example, if the graphical image 115 is moving toward the graphical object 120 and an end of the graphical image 115 intersects the graphical object 120, that point of intersection may be displayed as remaining in contact with the graphical object 130 and the simulated inertia of the graphical image 115 may cause the graphical image to rotate. Additional constraints or variables, such as friction, mass, etc. may be selected or preset to further increase realism.

In one version, the graphical image 115 may represent an articulated body. For example, as shown in FIG. 1, the graphical image 115 may comprise a first portion 145 attached to a second portion 150 at a pivot 155. This articulation adds complexity to the kinematic system thereby increasing the computational requirements for realistically controlling the display of the graphical image 115, particularly during interaction of the graphical image 115 with the graphical object 120. In addition, constraints may be applied to the articulated graphical image 115, such as range of pivotal motion, surface characteristics, etc.

Figure 2A:
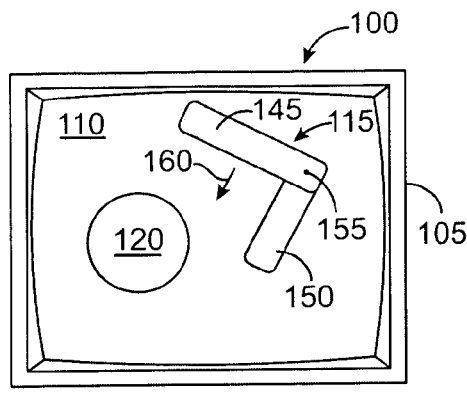
FIGS. 2a through 2c are schematics of an interaction between a graphical image and a graphical object having first constraints.
Figure 2B:
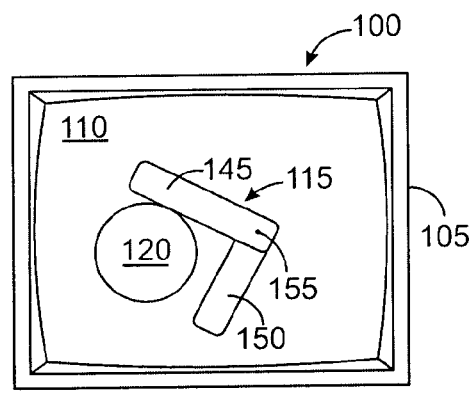
Figure 2C:
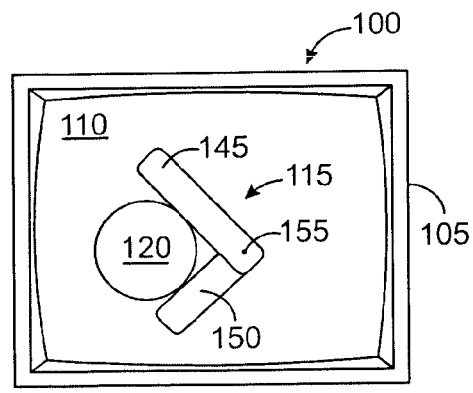

FIGS. 2a through 2c illustrate a first interaction between an articulate graphical image 115 and a graphical object 120. The graphical image 115 is initially in the position shown in FIG. 2a. The user then manipulates the user object 130 to cause the graphical image 115 to move toward the graphical object 120 in the direction of the arrow 160. FIG. 2b shows the graphical image 115 initially contacting the surface of the graphical object 120. Due to the direction of movement and to the shape of the graphical image 115, contact is first made between the first portion 145 of the graphical image 115 and the graphical object 120. At this position, the relationship between the positioning of the display of the graphical image 115 and the manipulation of the user object 130 is changed to account for the interaction of the graphical image 115 with the graphical object 130. If the simulation does not account for inertia of the graphical image 115 and does not account for continued manipulation of the user object 130 in the direction of the arrow, then the display of the graphical image 115 may be held at the position shown in FIG. 2b until the user object 130 is manipulated to cause the graphical image 115 to move in a direction other than in the direction of the arrow 160. In one version, the simulation accounts for inertia and/or continued manipulation of the user object 130 to further control the display of the graphical image 115, based on kinematics and constraints. For example, if the rotational stiffness about pivot 155 is selected to be relatively high and the amount of friction between the surfaces of the graphical image 115 and the graphical object 120 are set to be high, then the momentum of the movement of the graphical image 115 may cause the image to rotate and to cause the second portion 150 to contact the graphic object 120, as shown in FIG. 2c.

Figure 3A:
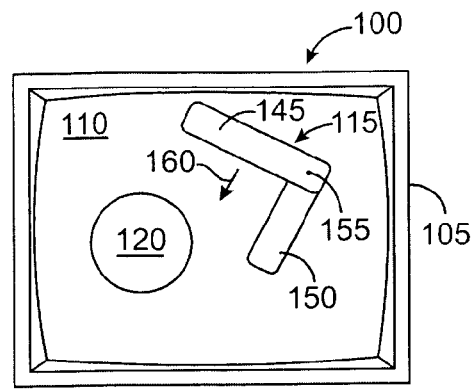
FIGS. 3a through 3c are schematics of an interaction between a graphical image and a graphical object having second constraints.
Figure 3B:
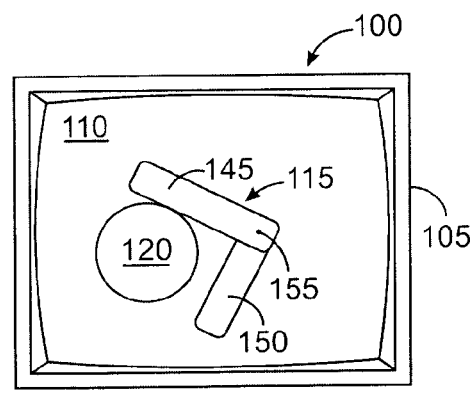
Figure 3C:
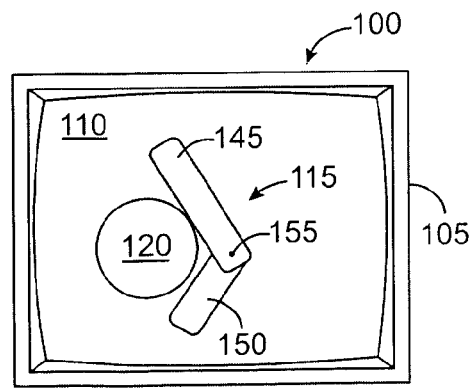

FIGS. 3a through 3c show an interaction similar to the interaction of FIGS. 2a through 2c, but with different constraints or variables selected or programmed. In this example, the rotational stiffness about the pivot 155 is very low allowing for easy rotation of the first portion 145 of the graphical image 115 relative to the second portion 150. FIG. 3a shows the initial position of the graphical image 115, which is the same as in FIG. 2a. The graphical image 115 is then caused to move in the direction of the arrow 160 to the graphical object contacting position shown in FIG. 3b, which is substantially the same as that shown in FIG. 2b. However, FIG. 3c shows the displayed effects of the different constraints. Because the pivot 155 is more freely allowed to rotate, the inertia of the second portion 150 continues generally in the direction of the arrow 160 causing a straightening of the graphical image 115. If there is sufficient inertia and/or sufficient continued manipulation of the user object 130 and/or sufficiently low friction between the surfaces of the graphical image 115 and the graphical object 130, then the graphical image 115 may continue on to a position where it is no longer in contact with the graphical object 120. Optionally when this occurs, the relationship between the user object and the displayed graphical image 115 may be restored to the relationship before initial contact was made.

Figure 4A:
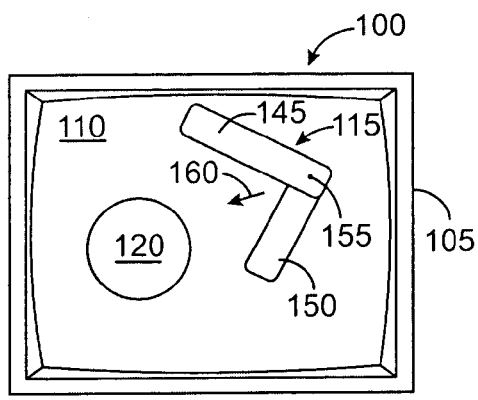
FIGS. 4a through 4c are schematics of an interaction between a graphical image and a graphical object having third constraints.
Figure 5A:
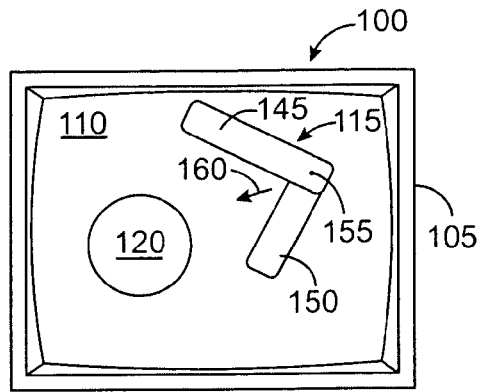
FIGS. 5a through 5c are schematics of an interaction between a graphical image and a graphical object having fourth constraints.
Figure 4B:
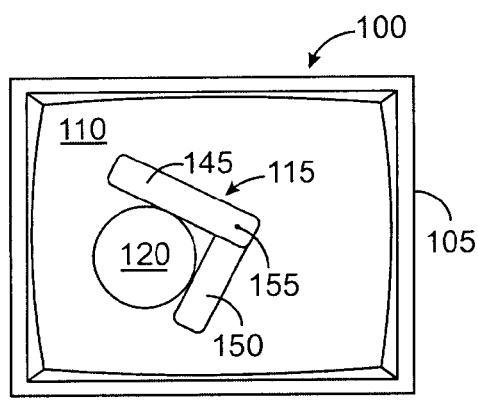
Figure 5B:
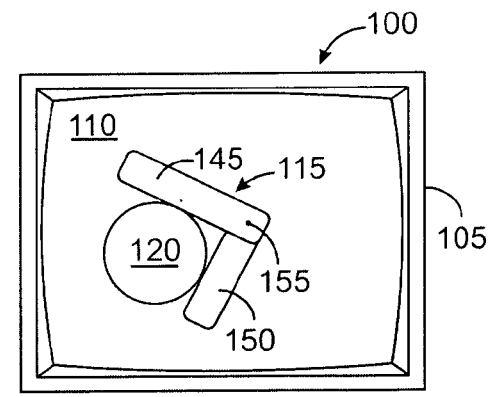
Figure 4C:
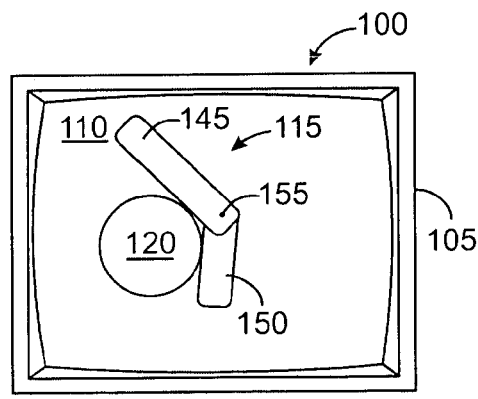
Figure 5C:
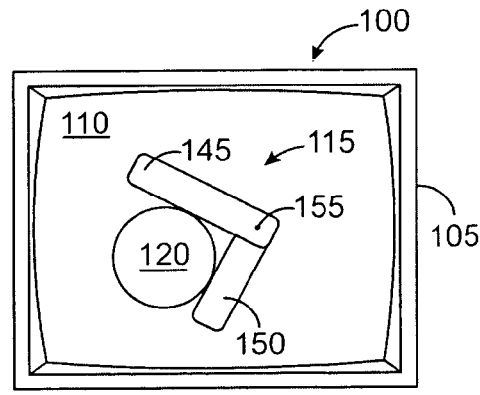

FIGS. 4a though 4c and FIGS. 5a through 5c illustrate additional examples of graphical image 115 and graphical object 120 interactions. FIG. 4a shows an articulated graphical image 115 in an initial position that is then caused by user object 130 to move in the direction of arrow 165. The graphical image 115 first contacts the graphical object 120 as shown in FIG. 4b. In the version of FIG. 4, a relatively low stiffness rotational pivot 155 and/or a low coefficient of friction is selected or programmed. Thus, the inertia or continued movement in the direction of arrow 165 may cause a spreading of the graphical image 115 to the position shown in FIG. 4c. In the version of FIGS. 5a through 5c, the rotational stiffness is increased and/or the frictional coefficient is increased. Accordingly, the initial position shown in FIG. 5a and the first contact position shown in FIG. 5b are substantially the same the that shown in FIGS. 4a and 4b, respectively. However, the different constraints cause a different resulting display shown in FIG. 5c where the inertia or user controlled force do not create a sufficient simulation force to overcome the stiffness of the pivot and/or the frictional force and to cause spreading of the graphical image 115.

The interaction may additionally or alternatively allow for dynamic interaction between the graphical image 115 and the graphical object 120. For example, the simulated energy of the graphical image 115 may cause the graphical object 120 to be displaced in accordance with selected or programmed constraints. In display of the graphical image 115 when it is in contact with the dynamically responsive graphical object 120 may be in accordance with the constraint solver and then revert back to being directly controlled by the user object 120 when there is no longer contact between the graphical image 115 and the graphical object 120.

In one version, the user object 120 allows the user to control the shape of the articulated graphical image 115. For example, the user object may control the rotation of the first portion 145 relative to the second portion 150 of the graphical image 115 about the pivot 155. FIG. 6a shows an initial position of an articulated graphical image 115. A user causes the first portion 145 and the second portion 150 to rotation about pivot 155 and to contact a graphical object 120, as shown in FIG. 6b. At this point further manipulation of the user object 120 does not cause the portions 145,150 to penetrate into the graphical object 120. Instead the display is held in the position shown in FIG. 6b. Alternatively, the momentum of the rotation of the continued manipulation of the user object 130 may be used in conjunction with selected or programmed constraints or variables to show a resulting interaction of the graphical image 115 with the graphical object 120. For example, in the version of FIGS. 6a through 6c, a sufficiently low coefficient of friction is selected that results in the graphical image 115 sliding off the graphical object 120 as shown in FIG. 6c. In FIGS. 7a–7c, the coefficient of friction is higher, and the graphical image 115 does not slide off the graphical object 120 as shown in FIG. 7c. In another version, as shown in FIGS. 8a through 8c, the graphical object 120 may be selected or programmed to be deformable, and the constraint solver can take the deformability of the graphical object 120 into account when calculating the display, as shown in FIG. 8c.

It has been discovered that by changing the relationship between the graphical image 115 and the manipulation of the user object 130 when the graphical image 115 interacts with a graphical object 120 a more realistic computer simulation results. When a user attempting to cause the graphical image 115 to abut a barrier, for example, it is desirable to not display the image as penetrating the barrier, if those are the desired constraints. By preventing the display of this penetration, the user feels more immersed in the graphical environment and does not significantly notice that his or her manipulation of the user object 130 has exceeded its target. Furthermore, it has been discovered that by having an articulated image that is capable of contacting the graphical object 120 at two or more points separated by an articulation, the realism of the interaction is even further enhanced. This allows the articulated graphical image to behave in a more natural manner in its interaction with the graphical object 120.

Figure 9:
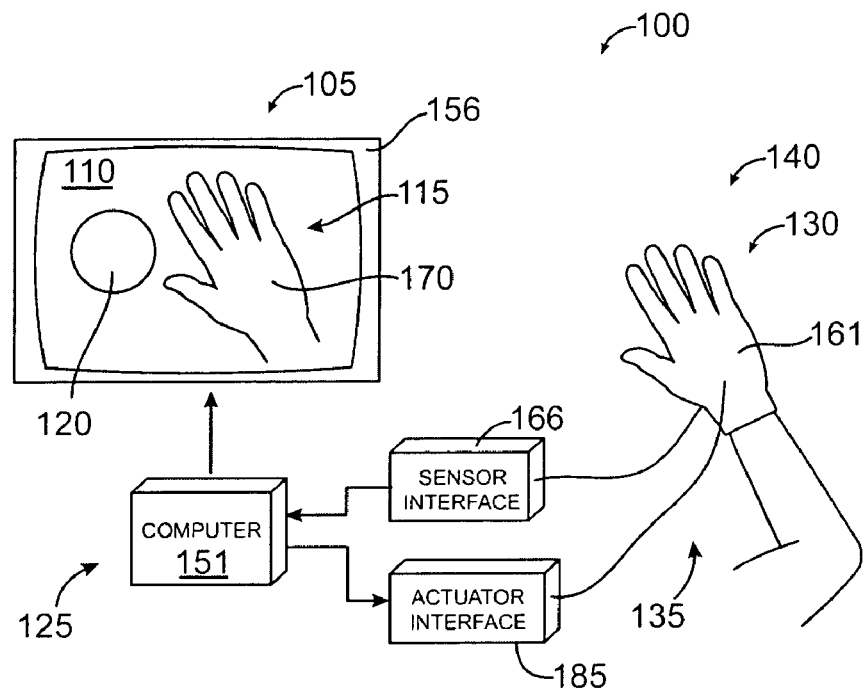
FIG. 9 is a schematic view of a simulation system having a computer controller.

The controller 125 may be a computer 151, or the like, such as the computer shown in FIG. 9. In one version, the computer 151 may comprise a processor and may be able to execute program code. For example, the computer may be a personal computer or workstation, such as a PC compatible computer or Macintosh personal computer, or a Sun or Silicon Graphics workstation. The computer 151 may be operable under the Windows™, MacOS, Unix, or MS-DOS operating system or similar. Alternatively, the computer 151 can be one of a variety of home video game console systems commonly connected to a television set or other display, such as systems available from Nintendo, Sega, or Sony. In other embodiments, the computer 151 can be a "set top box" which can be used, for example, to provide interactive television functions to users, or a "network-" or "internet-computer" which allows users to interact with a local or global network using standard connections and protocols such as used for the Internet and World Wide Web. The computer 151 may include a host microprocessor, random access memory (RAM), read only memory (ROM), input/output (I/O) circuitry, and/or other components of computers well-known to those skilled in the art. The computer 151 may implement an application program with which a user is interacting via peripherals, such as interface device 140 and/or user object 130. For example, the application program can be a simulation program, such as an interactive digital mockup of a designed feature, a medical procedure simulation program, a game, etc. Specifically, the application program may be a computer aided design or other graphic design program, an operating system, a video game, a word processor or spreadsheet, a Web page or browser that implements, for example, HTML or VRML instructions, a scientific analysis program, or other application program that may or may not utilize haptic feedback. Herein, for simplicity, operating systems such as Windows™, MS-DOS, MacOS, Linux, Be, etc. are also referred to as "application programs." The application program may comprise an interactive graphical environment, such as a graphical user interface (GUI) to allow the user to input information to the program. Typically, the application provides images to be displayed on a display screen 156 and/or outputs other feedback, such as auditory signals. The computer 151 is capable of generating a graphical environment 110, which can be a graphical user interface, game, simulation, such as those described above, or other visual environment. The computer 151 displays graphical objects 120, such as graphical representations and graphical images, or "computer objects," which are not physical objects, but are logical software unit collections of data and/or procedures that may be displayed as images by the computer on display screen 156, as is well known to those skilled in the art. The application program checks for input signals received from the electronics and sensors of the user object 130, and outputs force values and/or commands to be converted into haptic output for the actuator 135. Suitable software drivers which interface such simulation software with computer input/output (I/O) devices are available from Immersion Corporation of San Jose, Calif. Display screen 156 can be included in the computer and can be a standard display screen (LCD, CRT, flat panel, etc.), 3-D goggles, or any other visual output device.

In one version of the simulation system 100, the user object 130 comprises an instrumented glove 161. Within or on the instrumented glove 161 are one or more sensors that are capable of detecting a manipulation of the glove. A signal indicative of the detected manipulation is provided to the computer 151, optionally through glove sensor interface 166, to control the position, orientation, and/or shape of the graphical image 115, which may be for example a graphical hand 170 as shown in the version of FIG. 9.

The position of the instrumented glove 161 may be used to control the position of the graphical hand 170 in the graphical environment 110. The position of the instrumented glove 161 may be detected by one or more position sensors adapted to detect the position of the instrumented glove 161 in one, two, or three dimensions. The position sensor may include a grounded link connected to the instrumented glove 161. Alternatively, the position sensor may detect the position of the instrumented glove 161 in space, without being physically connected to a reference. For example in one version, the instrumented glove 161 comprises a Polhemus™ or Ascension™ electromagnetic position sensor to detect the three dimensional position of the instrumented glove 161 in space. The position sensor generates a signal related to the position of the instrumented glove 161 and the signal is provided to the computer 151. The computer 151 then controls the display of the graphical hand 170 in proportion to the signal according to a first relationship when the graphical hand 170 is not in contact with a graphical object 120. In one version, the displayed position of the graphical hand 170 is directly related to the position of the instrumented glove 161.

The orientation of the instrumented glove 161 may alternatively or additionally be used to control the graphical hand 170. An orientation sensor may be provided to detect the absolute or relative rotation of the instrumented glove 161 about one, two, or three orthogonal axes. As with the position sensor, the orientation sensor may be grounded or may be able to detect rotation in space. A signal related to the orientation of the instrumented glove 161 is then provided to the computer 151 which uses the signal to correspondingly control the display of the graphical hand 170. Accordingly, the rotation of the instrumented glove 161 about an axis results in a displayed rotation of the graphical hand 170 about an axis, for example a parallel axis. In one version, a single sensor may be used to detect both position and orientation. For example, a Polhemus™ or Ascension™ sensor may be used to detect the position of the instrumented glove 161 in six degrees of freedom. The computer 151 may then use the six degree of freedom signal to control the displayed position and orientation of the graphical hand 170.

Figure 10:
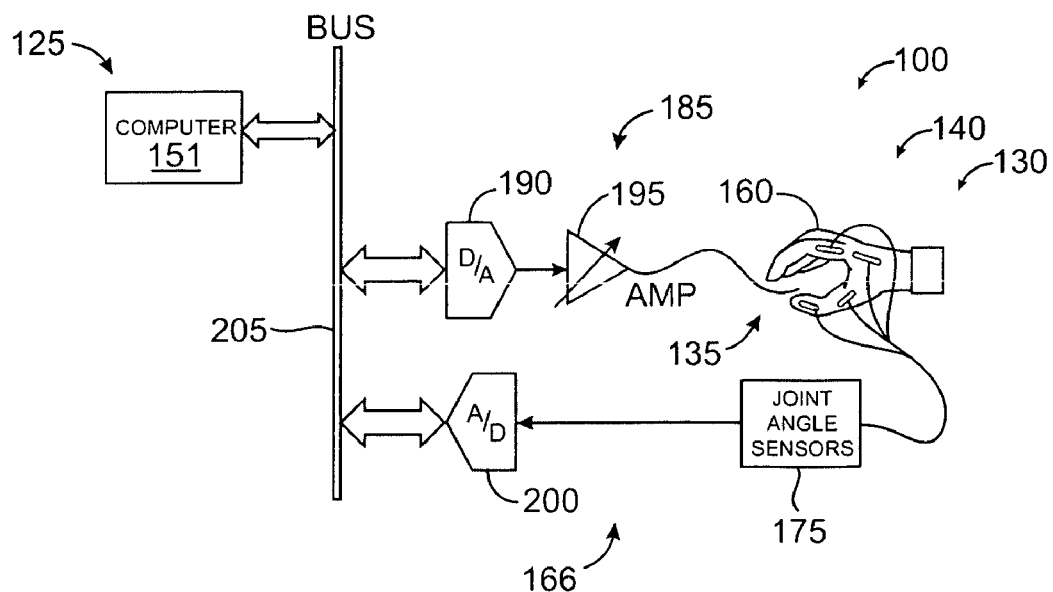
FIG. 10 is a schematic view of a simulation system with a communication bus.

Alternatively or additionally, the shape of the graphical hand 170 (or other graphical image 115) may be controlled by a user manipulating the instrumented glove 161. For example, one or more joint angle sensors may be provided to sense rotation about a particular joint in the hand (or other body part). The computer 151 may then control the display of the graphical hand 161 in relation to the sensed motion within the hand to, for example, show a corresponding movement of the graphical hand 170. In this way, the shape of the graphical hand 170 can be controlled to in response to manipulation of the instrumented glove 161 by the user. For example, a simulation may comprise the display of the graphical hand 170 to simulate the movement of the user's hand, such as by showing the graphical hand 170 closing and/or grasping when the user closes his or her hand or makes a grasping motion. One or more joint angle sensors 175, as shown in FIG. 10, may be positioned to detect the movement of a finger of the user. In another version, the movement of a plurality of fingers may be detected. In a relatively simple version, a single digital or analog sensor detects either an open condition or a closed condition of the user's hand, and the computer 151 correspondingly displays the graphical hand 170 either as being open or as being closed or grasping an object in the graphical environment 110. In another version, the joint angle position sensor may comprise an analog sensor that provides a variable signal by which the display of the graphical hand 170 may be controlled. The joint angle sensor may comprise one or more of a stain gage, a fiber optic sensor, a potentiometer, or the like.

In one version, the instrumented glove 161 may comprise both a position sensor and one or more joint angle sensors. For example, the instrumented glove 161 may comprise a CyberGlove™ available from Virtual Technologies, Inc. in Palo Alto, Calif., and described in U.S. Pat. Nos. 5,047,952 and 5,280,265, both of which are incorporated herein by reference in their entireties. In this version, individual joint angle sensors 175 comprise two long, flexible strain gages mounted back to back. The strain gage assemblies reside in guiding pockets sewn over a particular joint. When the joint is flexed, one of the strain gages of the corresponding pair of gages is in tension, while the other strain gage is in compression. Each pair of two strain gages comprise the two legs of a half bridge of a common Wheatstone bridge configuration. An analog multiplexer is used to select which of the half bridge voltages is to be sampled by an analog-to-digital converter. The maximum strain experienced by each gage is adjusted by varying the thickness and elastic modulus of the backing to which the gages are mounted. The backing is selected to maximize the signal output without significantly reducing the fatigue life of a gage.

In use, a user contacts the user object 130 to interact with the graphical environment 110. In the version shown in FIG. 9, the user dons the instrumented glove 161 and moves all or a portion of his or her hand to control the graphical hand 170 which mimics the motion of the user's hand. For example, the user may move his or her hand to the left in order to cause the graphical hand 170 to be rendered so as to appear to touch the graphical object 120. In additional, the user may slightly close and appropriately move his or her hand to make the graphical hand 170 appear to grasp the graphical object 120. When the graphical hand 170 engages the graphical object 120, the relationship changes, as discussed above, to allow for display of the interaction to be more realistic.

The realism of the simulation can be further increased by providing an actuator 135 adapted to provide one or more haptic sensations to the user during the user's interaction with the graphical environment 110. The actuator may either provide the haptic sensation directly to the user or may apply the haptic sensation to the user through the user object, for example by applying a force to the surface of the instrumented glove 161. This allows the user to not only visualize the graphical hand 170 contacting the graphical object 120, but also to receive an indication through the user's sense of touch that the object has been contacted, thereby providing a more immersive experience. The actuator 135 may comprise, for example, a finger forcing mechanism comprising a tip portion adapted to contact a portion of the user's finger. The tip portion may be connected to a tendon which may be pulled by an actuating mechanism to exert a force on the finger. A force-augmenting structure may also be provided to provide more realistic forces to the finger tip. In one particular version, the haptic interface is a CyberGrasp™ device available from Virtual Technologies, Inc. and described in U.S. Pat. Nos. 5,631,861 and 6,042,555, both of which are incorporated herein by reference in their entireties. The finger forcing mechanism may be worn on the hand and applies computer-controlled force feedback to one or more, preferably each, of the fingers. The haptic interface 140, which includes actuator interface 185, may be advantageously used to simulate the interaction of the graphical hand 170 and a graphical object 120. An instrumented glove 161 is worn to control the graphical hand 170. The user uses his or her hand to grasp the graphical object 120 with the graphical hand 170. The computer transmits force commands to the actuating mechanisms associated with the finger forcing mechanism so the user may "feel" the graphical object 120 in his or her fingertips. The computer may also transmit force commands to the actuating mechanisms associated with the finger forcing mechanism so the user may also "feel" the graphical object 120 in his or her palm, as disclosed in U.S. patent application Ser. No. 09/837,860 filed on Apr. 17, 201 which is incorporated herein by reference in its entirety. Thus, both precision grasps, which primarily use the finger tips, and power grasps, where an object is held against a user's palm, may be simulated. In another version, the haptic interface may be provided by a CyberTouch™ device available from Virtual Technologies, Inc., and described in U.S. Pat. No. 6,088,017 which is incorporated herein by reference in its entirety. Additionally or alternatively, the haptic interface may comprise a CyberForce™ device available from Virtual Technologies, Inc. and described in U.S. Pat. Nos. 5,631,861 and 6,042,555 and in U.S. Provisional Patent Application 60/191,047 filed on Mar. 21, 2000, all of which are incorporated herein by reference in their entireties. In this version, the haptic interface 140 comprises a finger forcing mechanism and a grounded force applying member attachable to the user at the wrist, for example, the grounded force applying member may be capable of applying forces in from one to six degrees of freedom and may also be capable of detecting movement in from one to six degrees of freedom.

FIG. 10 shows how the electrical and mechanical signals propagate through an embodiment of the simulation system 100. In this version, an actuating mechanism, such as a DC servo motor causes the actuator to apply a force to the user. The computer 151, or other controller or signal processor, sends a digital value representing the desired actuation level control signal to the digital-to-analog converter 190. The analog output of the digital-to-analog converter 190 may then be amplified by a variable gain amplifier 195 to produce an analog voltage activation signal. This voltage is placed across the servo motor, driving the motor a desired amount. The voltage signal may alternately be converted to a current activation signal for driving the motor at a desired torque. The joint angle sensors 175 generate an analog signal related to the relative angle of rotation of a joint. The signals from the joint angle sensors 175 are passed through an analog-to-digital converter 200 to provide digitized values to the computer as a physical state signal. In the graphical environment 110, the physical state signal may then cause motion in a corresponding graphical hand 170. If the graphical hand 170 or a portion of the graphical hand 170 contacts a graphical object 120 in a predetermined manner, a haptic sensation is output to the user. For example, in one version, the computer 151 calculates the force to be applied using data related to the graphical object's shape and/or compliance. The computer 151 then causes an activation signal to be sent to the forcing mechanism to convey haptic information about that virtual force. The computer 151, digital-to-analog converter 190, analog-to-digital converter 200, bus 205 and variable gain amplifier 195 may be elements of a signal processor.

Another version of the simulation system 100 according to the present invention comprises a user object 130 capable of detecting the position of the hand of a user, but that does not have to be worn like a glove. Instead, the user may place his or her hand in contact with the user object 130 in order to interact with the graphical environment 110. For example, the user object 130 may comprise a mouse-type device which is manipulatable in at least a planar workspace by a user. This version is convenient and inexpensive to implement while still providing an advantageous virtual reality experience to the user. In another version, the interface device may comprise a haptic mouse device. U.S. Pat. Nos. 6,211,861, 6,100,874, 6,166,723, U.S. patent application Ser. No. 09/585,741 filed on Jun. 2, 2000, and U.S. Provisional Patent Application 60/224,584 filed on Oct. 11, 2000 describe versions of haptic mice and are incorporated herein by reference in their entireties.

EXAMPLE

In one version, the present invention comprises a computer readable medium housing program code programmed to calculate the best displayed position of the graphical image 115 during image interaction based on selected or programmed constraints of the system. In one particular version, the invention comprises a quadratically converging, linearly scalable constraint solver and objective optimization algorithm for haptics and graphics interaction. Alternatively, the constraint solver may be used without the haptic interaction. Any constraint that can be encoded mathematically can be used.

In one version, the constraint solver is based on numerical methods. While the kinematic optimization problem is non-linear in general, the present invention takes advantage of key numerical aspects of the problem domain to achieve high speed interaction with haptics or other types of devices suitable for incorporation into force control and graphics display packages. In this version, the invention includes an algorithm that is efficient for interactive manipulation and sensitivity analysis. Standard iterative techniques that carry cubic cost are often not suitable for virtual mechanical systems. The present invention performs numerical operations on an underconstrained system, i.e. one in which the mechanism can move. However, the constraints that may be specified by a user can be redundant, and introduce singularities. The pseudo-inverse of a non-rectangular, singular matrix, is a complication in the solution step. The present inventors have discovered that a ridge regression technique is suitable and does not degrade the quadratically converging characteristics of the solution. The present invention leverages a conjugate gradient algorithm to perform singular matrix pseudo-inverse operations, designed to allow sparse matrix operations throughout. The invention uses a linear-time cost operation to allow for interaction with large mechanical systems. Every step of the modified conjugate gradient algorithm is performed in linear time. In one version of the invention, the technique has multiple steps, each of which has linear cost, so the total cost of the algorithm is asymptotically linear. In one particular version, the technique has at least five steps. The problem domain allows the invention to convert a cubic cost iterative method to one that has linear cost.

In this version, the invention comprises an algorithm designed to possess one or more of the following numerical properties that are exploitable for high-performance interaction: sparse, symmetric, positive, semidefinite (PSD), linear time, quadratically converging, singularity/consistency analysis, good numerical conditioning, and regularization of the iterations. These characteristics enable the algorithm to achieve performance adequate for one or more of graphic updates and haptic feedback.

In one version, a numerical method scales to very large systems, and it does it in a general way. It has been tested for use with a system with 105 constraints and 40 bodies, at interactive rates, with matrices on the order of 400×300. There is an animation of a surface—surface spatial cam constraint system and finger grasping surface constraint system, which shows the flexibility of our solver to incorporate a number of differently encoded constraint systems. The objective determined by the inventors was to find the best parameters, denoted by vector q, with the condition that the physical assembly constraints are met. In other words, an admissible configuration manifold, $$C(q)=0,$$

is moved along such that an objective $f(q)$ can be minimized.

The solution to this problem is to solve for the configurations q. Undetermined, additional variables, the vector $\lambda$, are found such that $$\nabla f = -\lambda \nabla C.$$

It has been discovered that to find the best solution for $f$ so that the constraints are not violated, the derivatives of $f$ and $C$ point in opposite, parallel directions, scaled only by the vector $\lambda$. In other words, the function $f$ is as small as possible without violating the constraint manifold. As will be seen, solving $\nabla f = -\lambda \nabla C$ requires evaluating the terms $\nabla\nabla f$, $\nabla\nabla C^*\lambda$ and $\nabla\nabla C^*C$ (which are not the Identity matrix).

The solution to $\nabla f = -\lambda \nabla C$ can be thought of as minimizing $$L = \nabla f + \lambda \nabla C.$$

The optimization update for minimizing $L = \nabla f + \lambda \nabla C$, i.e. solving $\nabla L = 0$, makes use of derivatives up to second order. For $x = [q, \lambda]^T$, the roots are found according to $$\Delta x = -(\nabla L(x))^{-1} L(x).$$

More specifically, the following system is solved:

$$\begin{bmatrix} \nabla \nabla f + \nabla \nabla C^T \lambda & C_q^T \\ C_q & 0 \end{bmatrix} \begin{bmatrix} \Delta q \\ \Delta \lambda \end{bmatrix} = -\begin{bmatrix} \nabla f + \nabla C^T \lambda \\ C \end{bmatrix}.$$

The terms may be augmented with additional objectives, or merit, that further ensures the constraints are met, $$L = \nabla f + \lambda \nabla C + \nu C^T C.$$

$\nu$ is a diagonal matrix of weights. The update, used in the final solution, becomes $$\begin{bmatrix} \nabla \nabla f + \nabla \nabla C^T \lambda + \nu \nabla \nabla C^T C & C_q^T \\ C_q & 0 \end{bmatrix} \begin{bmatrix} \Delta q \\ \Delta \lambda \end{bmatrix} = -\begin{bmatrix} \nabla f + \nabla C^T \lambda + \nu \nabla C^T C \\ C \end{bmatrix}.$$

The change in q and lambda can be updated at kilohertz rates. We can obtain $\Delta \lambda$ can be obtained first, and then $\Delta q$ can be solved for.

$$(\nabla \nabla f + \nabla \nabla C^T \lambda + \nu \nabla \nabla C^T C) \Delta q + C_q^T \Delta \lambda = -(f + \nabla C^T \lambda + \nu \nabla C^{TC})$$

can be written as $$H \Delta q + C_q^T \Delta \lambda = b_a$$

where $b_a = -(f + \nabla C^T \lambda + \nu \nabla C^{TC})$.

$$\Delta q = H^{-1}(-C_q^T \Delta \lambda + b_a)$$

can be substituted into the equation $$C_q \Delta q = b_b,$$

then the multipliers can be computed through $$(C_q H^{-1} C_q^T) \Delta \lambda = b_a.$$

$\Delta q$ is then obtained from the earlier equation to complete the optimization update. Each step can be carried out in linear time through conjugate gradient (CG) iteration and sparse vector-matrix products. The CG iteration uses a multiplication of a vector, say w, and a piecewise sparse matrix. $(C_q H^{-1} C_q^T) w$ can be evaluated as $C_q (H^{-1}(C_q^T w))$. A vector product with $C_q^T$ or $C_q$ in linear time is straightforward.

This analysis requires a series of linear cost steps, resulting in a linear cost computation. This combination of operations is uniquely applied in our system to interactive grasping, interactive mechanical design, and surface—surface contact interactions. The CG iteration requires a multiplication of a vector, say w, and a piecewise sparse matrix. $(C_q H^{-1} C_q^T) w$ can be evaluated as $C_q (H^{-1} (C_q^T w))$. A vector product with $C_q^T$ or $C_q$ in linear time is straightforward.

The computation, in summary, is as follows:

1. Evaluate $\Delta \lambda$ through CG iteration on $C_q (H^{-1}(C_q^T) w)$.
   a. Compute $w_a = C_q^T w$ sparsely, in O(n).
   b. Compute $w_b = H^{-1} w_a$ sparsely, in O(n).
   c. Compute $w_c = C_q w_b$ sparsely, in O(n)
2. Evaluate $\nabla q = H^{-1}(-C_q^T \nabla \lambda + b_a)$ through a sparse matrix-vector product $C_q^T \Delta \lambda$ (O(n)) and $H^{-1} w_d$ (O(n)) product. (the vector addition $w_d = -C_q^T \Delta \lambda + b_a$ is O(n)).
3. A subroutine allows the inverse of the Hessian matrix to be multiplied by a vector in linear time. It is desired to evaluate, for an arbitrary vector v, $$v_2 = H^{-1} v,$$

or, $$H v_2 = v.$$

The desired result, $v_2$, is obtained in linear time through CG iteration as well. In practice, this matrix operation has good performance; only 2–6 iterations are required in the steady state due to coherence.

This subroutine is used in Step 1 and 2. Although the CG iterations are nested in 1-b., the number of times that the inner and outer CG iterate in the problem domain may be a constant, so as to not affect the O(n) performance characteristics by nesting the Hessian matrix CG inside the Newton CG iteration.

In another version, refinements for increased numerical performance in the problem domain may be utilized. For example, the kinematic parameters q used in a system, and any optimization system in general, may have differently scaled units, such as meters and quaternion magnitudes. The difference in magnitude will cause difficulties in the numerical conditioning of the system of equations. One approach is to incorporate a model-based preconditioning algorithm that can dynamically rescale the system for best performance.

In one version, the optimization updates can be written in the form $$M \Delta q = n$$

The system of equations can be reformulated as $$M N (N^{-1} \Delta q) = n$$

N will contain a diagonal matrix of scaling factors. These elements can be obtained from the columns of M because the columns correspond to system parameters. This technique is very efficient.

The improvement in performance gained in this technique is very significant. When using the present invention, users can rescale their CAD models, for example, at any time, allowing the optimization algorithm to be insensitive to parameter unit selection. In one version, the optimization variables may include a quaternion component q, for defining orientation of each body. The elements of the quaternion are not independent. The unit length constraint on quaternions and the first and second derivative tensors of this constraint is included in the system.

For the unit length constraint $q_r \cdot q_r - 1 = 0$, the Jacobian and Hessian-vector product are $$J = 2 q_r$$

$$H \cdot vector_{1 \times 1} = 2 \cdot I_{4 \times 4} \cdot vector_{1 \times 1}$$

where vector is either the constraint or Lagrange multiplier associated with the quaternion length condition.

During grasping simulation, a sensed hand controls the display of a graphical hand. Often, an assembly, such as a force feedback assembly, cannot prevent movement of the sensed hand beyond a simulated contact position of the graphical hand with a graphical object. To improve grasping simulation in this instance, the graphical hand may be constrained against penetration into the graphical object. A grasping assembly that includes a graphical hand that does not penetrate a graphical object comprises a graphical hand that matches the measured hand as closely as possible, but does not violate its joint definitions or virtual assembly constraints. A unilateral floating contact constraint is maintained between each finger segment of the graphical hand and the closest point on the graphical object. The graphical hand can lift away from the graphical object when the user's measured hand moves away.

In one version, the present invention encodes distance objectives to measure the separation between each finger part from the sensed finger part to the graphical finger part. This measure is in Cartesian and quaternion space. When more than one finger segment requires ghosting due to penetration, the distance objectives are summed, and the distance Jacobian and Hessians are populated. This approach is well-defined because only the Jacobians and Hessians of the objectives are used in the algorithm. Each finger part has a separate column in the Jacobian and block in the Hessian.

The present invention is useful in many applications. For example, the invention may be used for one or more of simulation of kinematic behavior of large mechanical assemblies at force-control rates, optimal grasp simulation, taking into account articulated body motion and hand penetration into graphical objects, taking glove motion capture data on an assembled hand (non penetrating, optimal hand) for redisplay of a kinematically viable hand for training, animation, modeling, etc., improved manipulation with a mouse or other interface device, mechanical design optimization (select design variables on nonlinear problems, solve for the "best" design during manipulation at interactive rates), kinematic motion simulation for assemblies with NURBS and subdivision surface constraints, such as spatial cam-follower subassemblies, better grasp through floating contact, unilateral surface constraints solving. In versions of the invention, polygonal approximations of fingers and grasped objects can be avoided.

Figure 11:
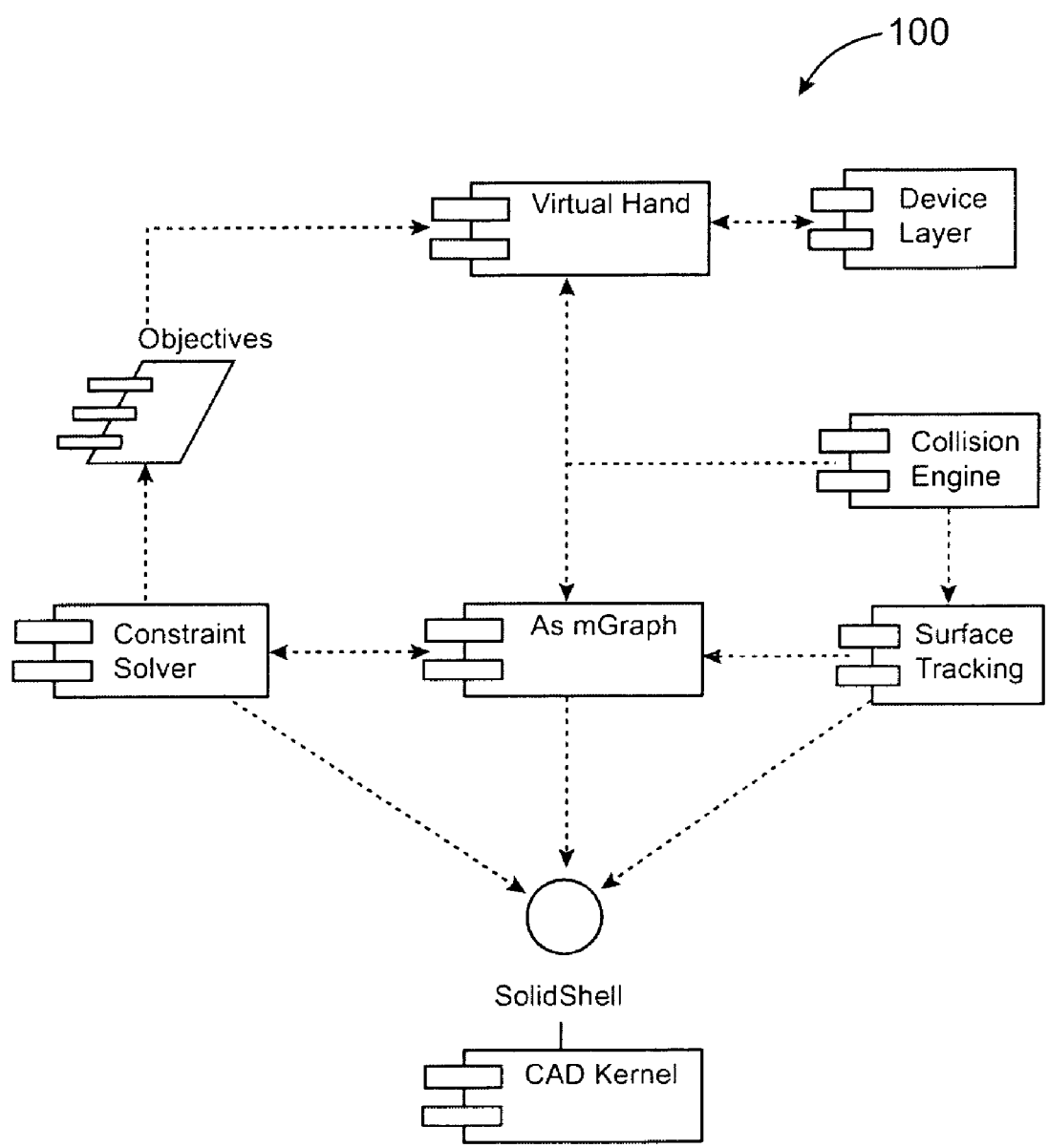
FIG. 11 is a schematic of the components of a version of the simulation system.

FIG. 11 shows a schematic illustration of the interrelationship between parts of the a version of the simulation system 100. The software may be housed on a computer readable medium which may comprise one or more of as memory in the computer, a magnetic disk or tape, a compact disk, a digital video disk, or the like. In one version, the computer readable program may be downloaded to the computer from a remote source via a networked connection.

While this invention has been described in terms of several preferred embodiments, it is contemplated that alterations, permutations and equivalents thereof will become apparent to those skilled in the art upon a reading of the specification and study of the drawings. For example, many different types of haptic sensations can be provided with the haptic interface of the present invention and many different types actuators and user objects can be used, including the use of two user objects to detect manipulation of both hand of a user. Additionally, the interface device may be a master device that also controls a slave device. Furthermore, certain terminology, such as terms like x, y, z, left, right, up, down, etc., has been used for the purposes of descriptive clarity, and not to limit the present invention. Therefore, the appended claims should not be limited to the description of the preferred versions contained herein and should include all such alterations, permutations, and equivalents as fall within the true spirit and scope of the present invention.

What is claimed is:

1. A method, comprising:
    sensing a manipulation of an articulatable object configured to be coupled to a host computer system that includes a graphical environment;
    updating data values associated with at least one of a displayed orientation and a displayed shape of a graphical image in the graphical environment in relation to the sensed manipulation;
    changing a relationship between the sensed manipulation and the at least one of the displayed orientation and the displayed shape of the graphical image based on a simulated interaction of the graphical image with a graphical object; and
    calculating one of the displayed orientation and the displayed shape of the graphical image,
    wherein calculating includes using a quadratically converging and linearly scalable constraint solver employing a ridge regression technique.

2. The method of claim 1, wherein calculating includes using constraints to calculate the at least one of the displayed orientation and the displayed shape of the graphical image.

3. The method of claim 1, wherein calculating includes using numerical methods to calculate the at least one of the displayed orientation and the displayed shape of the graphical image.

4. The method of claim 1, wherein the object is configured to provide haptic feedback.

5. The method of claim 4, wherein the haptic feedback is associated with the simulated interaction of the graphical image and the graphical object.

6. A method, comprising:
    sensing a manipulation of an articulatable object configured to be coupled to a host computer system including a graphical environment;
    updating data values associated with at least one of a displayed orientation and a displayed shape of a graphical image in the graphical environment in relation to the sensed manipulation; and
    changing a relationship between the sensed manipulation and the at least one of the displayed orientation and displayed shape of the graphical image by calculating at least one of the displayed orientation and displayed shape of the graphical image,
    wherein the calculating includes using a quadratically converging and linearly scalable constraint solver employing a ridge regression technique.

7. The method of claim 4, wherein the object is configured to provide haptic feedback.

8. The method of claim 7, wherein the haptic feedback is associated with a simulated interaction of the graphical image and the graphical object.

9. A method, comprising:
    sensing a manipulation of an object configured to be coupled to a host computer system including a graphical environment;
    updating data values associated with at least one of a position and a shape of an articulated graphical image in the graphical environment based on the sensed manipulation, the articulated graphical image having a first image portion and a second image portion, the first image portion being movable with respect to the second image portion;

changing a relationship between the sensed manipulation and the at least one of the position and shape of the articulated graphical image; and calculating the at least one of the position and shape of the articulated graphical image, wherein calculating includes using a quadratically converging and linearly scalable constraint solver employing a ridge regression technique.

10. The method of claim 9, wherein calculating includes using constraints to calculate the at least one of the position and the shape of the graphical image.

11. The method of claim 9, wherein calculating includes using numerical methods to calculate the at least one of the position and the shape of the graphical image.

12. The method of claim 9, wherein the object is configured to provide haptic feedback.

13. The method of claim 12, wherein the haptic feedback is associated with a simulated interaction of the graphical image and the graphical object.

* * * * *

UNITED STATES PATENT AND TRADEMARK OFFICE
CERTIFICATE OF CORRECTION

PATENT NO. : 7,084,884 B1 Page 1 of 1
APPLICATION NO. : 09/912434
DATED : August 1, 2006
INVENTOR(S) : Donald Nelson and Christopher J. Ullrich It is certified that error appears in the above-identified patent and that said Letters Patent is hereby corrected as shown below:

On the title page item [75]: "Inventors," please correct the second inventor's last name from "Ulrich" to -- Ullrich --

Signed and Sealed this

Nineteenth Day of December, 2006

JON W. DUDAS
*Director of the United States Patent and Trademark Office*